United States Patent
Thelen

(10) Patent No.: US 9,507,797 B2
(45) Date of Patent: Nov. 29, 2016

(54) CROSS-PROTOCOL LOCKING WITH A FILE SYSTEM

(75) Inventor: Greg Thelen, Fort Collins, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 147 days.

(21) Appl. No.: 14/115,269

(22) PCT Filed: Jun. 6, 2011

(86) PCT No.: PCT/US2011/039229
§ 371 (c)(1),
(2), (4) Date: Nov. 1, 2013

(87) PCT Pub. No.: WO2012/170004
PCT Pub. Date: Dec. 13, 2012

(65) Prior Publication Data
US 2014/0089347 A1 Mar. 27, 2014

(51) Int. Cl.
G06F 7/00 (2006.01)
G06F 17/30 (2006.01)
G06F 21/62 (2013.01)
H04L 29/06 (2006.01)

(52) U.S. Cl.
CPC ... G06F 17/30194 (2013.01); G06F 17/30171 (2013.01); G06F 17/30203 (2013.01); G06F 21/6218 (2013.01); H04L 63/10 (2013.01); G06F 2221/2141 (2013.01)

(58) Field of Classification Search
CPC ............... G06F 21/6218; G06F 17/30082; G06F 21/53
See application file for complete search history.

(56) References Cited

U.S. PATENT DOCUMENTS

| | | | |
|---|---|---|---|
| 5,175,852 A | 12/1992 | Johnson et al. | |
| 6,055,547 A | 4/2000 | Cooper | |
| 6,389,420 B1 | 5/2002 | Vahalia et al. | |
| 6,697,846 B1 | 2/2004 | Soltis | |
| 7,293,097 B2 | 11/2007 | Borr | |
| 7,313,557 B1 * | 12/2007 | Noveck | G06F 17/30171 |
| 7,360,034 B1 * | 4/2008 | Muhlestein | H04L 63/10 709/215 |
| 7,406,473 B1 | 7/2008 | Brassow et al. | |
| 7,487,228 B1 | 2/2009 | Preslan | |
| 7,730,258 B1 * | 6/2010 | Smith | G06F 3/0622 711/114 |
| 7,937,453 B1 * | 5/2011 | Hayden | G06F 17/30203 707/607 |
| 2002/0019874 A1 * | 2/2002 | Borr | G06F 17/30171 709/229 |

(Continued)

FOREIGN PATENT DOCUMENTS

JP 2009211668 9/2009

OTHER PUBLICATIONS

Haas, HPC in Science & Engineering, SBAC-PAD 2005—High Performance Computing in Science and Engineering, Oct. 2005 (15 pages).

(Continued)

Primary Examiner — Tuan A Pham
(74) Attorney, Agent, or Firm — Trop, Pruner & Hu, P.C.

(57) ABSTRACT

A file system is to be shared by multiple file servers according to respective different file server protocols, and the file system is to implement cross-protocol locking in access of file system objects of the file system. A file system denies access to a particular file system object from a first file server protocol in response to a data structure referred to by an inode indicating that an access from a second different file server protocol of the particular file system object is present.

18 Claims, 13 Drawing Sheets

(56) References Cited

U.S. PATENT DOCUMENTS

| | | | |
|---|---|---|---|
| 2006/0090049 A1* | 4/2006 | Saika | 711/162 |
| 2007/0088702 A1* | 4/2007 | Fridella et al. | 707/10 |
| 2007/0100893 A1 | 5/2007 | Sanders | |
| 2007/0162749 A1* | 7/2007 | Lim | 713/167 |
| 2010/0145917 A1* | 6/2010 | Bone et al. | 707/694 |
| 2012/0296944 A1 | 11/2012 | Thelen | |

OTHER PUBLICATIONS

ISR/WO, PCT/US2011/039229, HP reference 82261367, Feb. 9, 2012, 10 pgs.

Wikipedia, File Descriptor dated Dec. 10, 2010 (4 pages).

Wikipedia, Network File System (Protocol) dated on or before Mar. 11, 2011 (1 page).

Wikiepdia, Server Message Block dated Mar. 9, 2011 (10 pages).

* cited by examiner

IN-MEMORY INODE (200)

| inode_number | integer |
|---|---|
| inode_type | integer (file, directory, etc.) |
| inode_sub_type | integer (normal, protocols_directory) |
| file system ID | integer |
| inode_protocol_usage | protocol_usage_table |
| inode_reference_count | integer |
| inode_protocol | CIFS, NFS, etc., UNSET |

FIG. 2

IN-MEMORY INODE CACHE (300)

| inode_number_1 | in-memory inode_1 |
|---|---|
| inode_number_2 | in-memory inode_2 |
| ... | ... |

302 — inode_number_1 row
304 — inode_number_2 row

FIG. 3

PROTOCOL USAGE TABLE (400)

| | | |
|---|---|---|
| protocol_reference_count | integer | |
| protocol_A | num_A_readers | num_A_writers |
| protocol_B | num_B_readers | num_B_writers |
| ... | ... | ... |

401 — protocol_reference_count row
402 — protocol_A row
403 — protocol_B row

FIG. 4

IN-MEMORY DIRECTORY ENTRY (500)

| | |
|---|---|
| link_name | string |
| inode_number | integer |
| ... | ... |

FIG. 5

IN-MEMORY FILE HANDLE (600)

| | |
|---|---|
| file_inode | in-memory inode |
| file_access | read and / or write |
| ... | ... |

FIG. 6

CROSS-PROTOCOL LOCKING WITH A FILE SYSTEM

CROSS-REFERENCE TO RELATED APPLICATION

This application is a national stage application under 35 U.S.C. §371 of PCT/US2011/39229, filed Jun. 6, 2011.

BACKGROUND

Computers can use file systems to store different types of objects. Typical objects include files and directories. Directories are hierarchical arrangements of objects, and may have nested objects. Directories include files or file folders and sub-directories. File systems use storage media to store objects, such as hard drives, flash media, or other non-volatile storage.

A file system also uses and stores metadata that describes information about the file system. Such metadata is typically hidden from users (which can include applications in a computer system). The metadata describes where on the physical storage media the files are located. The storage media may be considered as a large array of bytes. However, the file system does not appear to a user or to be an array of bytes, but rather includes a hierarchy of objects such as files and directories. The mapping between the bytes in the storage media and the hierarchy of the files is described in the metadata. In other words, the metadata provides a mapping between the physical storage of the data and how the data is presented to the user. More specifically, the metadata provides a description as to where each file or portion of a file is located on the storage media. Note that while a file or directory may appear contiguous to a user, the file as stored on the storage media may be located in many different areas.

BRIEF DESCRIPTION OF THE DRAWINGS

Some embodiments are described with respect to the following figures:

FIG. 2 depicts an in-memory inode including a count data structure according to some implementations;

FIG. 3 illustrates an in-memory inode cache according to some implementations;

FIG. 4 illustrates a protocol usage table according to some implementations;

FIG. 5 illustrates an in-memory directory entry according to some implementations;

FIG. 6 illustrates an in-memory file handle according to some implementations;

DETAILED DESCRIPTION

Figure 1A:
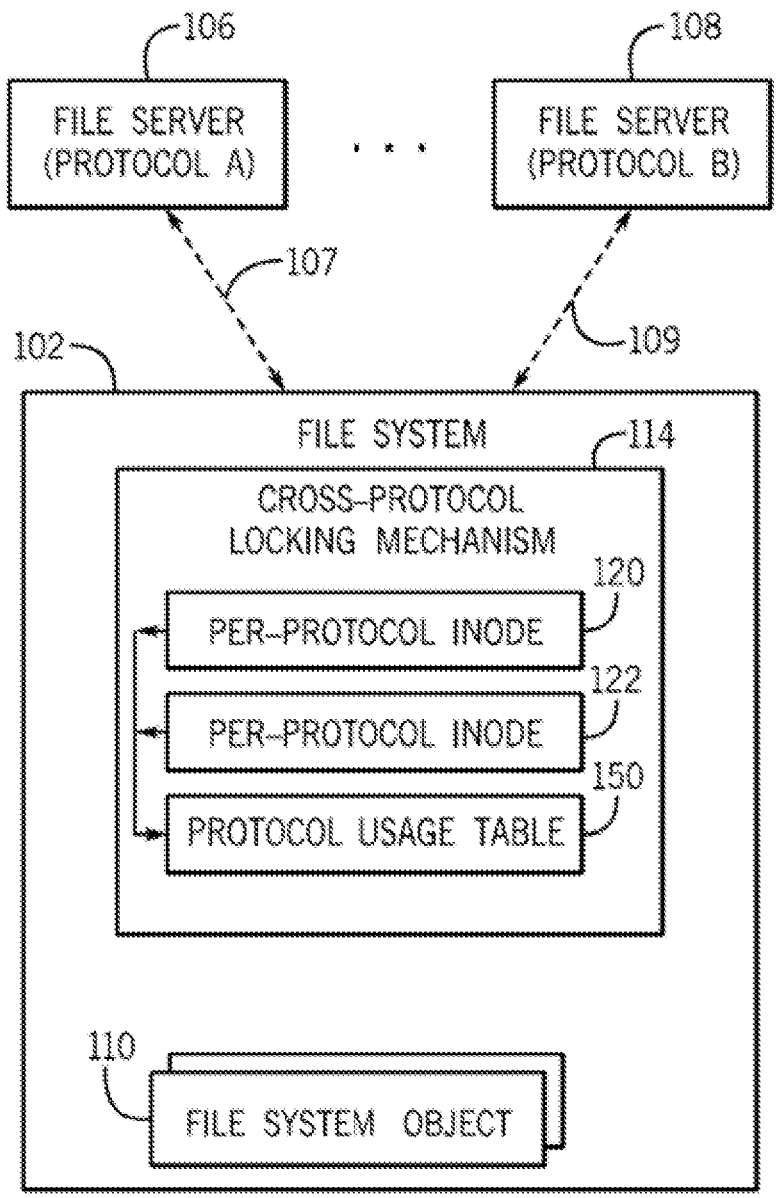
FIGS. 1A-1B depict example arrangements that incorporate various implementations.

FIG. 1A illustrates an example arrangement that has a file system 102 according to some implementations. In examples according to FIG. 1A, multiple file servers 106, 108, are depicted, where the file servers 106, 108 are able to access the file system 102 to perform various operations (e.g. read and write operations) on file system objects 110 of the file system 102. In the diagram of FIG. 1A, two file servers are shown—in different examples, more than two file servers cart be provided. Although just one file system is shown in FIG. 1A, note that there can be multiple file systems in other examples.

A file server is a system that is accessible by clients for accessing shared storage. In this case, the shared storage is provided by the file system 102. The multiple file servers 106, 108 operate according to different file server protocols (referred to as "protocol A" and "protocol B" in FIG. 1A). Example file server protocols include a CIFS (Common Internet File System) protocol, an NFS (Network File System) protocol, HTTP (Hypertext Transfer Protocol), or any other protocol.

Different file server protocols may employ different file locking semantics, where file locking semantics control locking of a particular data object that is being accessed such that the particular data object is not accessed by another requester. For example, while a first requester is performing a read access of the particular data object the particular data object is locked such that a second requester would not be able to perform a write access of the particular data object.

As an example of a difference in locking semantics between different file server protocols, the CIFS protocol allows a client to prohibit other clients from opening a file using a "share mode." On the other hand, the NFS protocol has no concept of the share mode. Thus, if the CIFS file server is accessing a particular file using the share mode, and a later request comes from the NFS file server for the same file, typical systems may not be able to enforce the shared mode request made by the CIFS fife server. This can result in corruption of data.

Enforcing locking semantics between different file server protocols can be complex. However, in accordance with some implementations, the file system 102 includes a cross-locking protocol mechanism 114 that provides a relatively efficient mechanism for ensuring that appropriate locking is provided in response to requests from different file server protocols for the same fits system object. As used herein, a "request from a file server protocol" refers to a request submitted by the respective file server that operates according to the file server protocol. The file server may have submitted the request in response to a request from a client.

In accordance with some implementations, the file servers 106, 108 according to the different file server protocols are able to access the file system 102 over respective separate paths 107 and 109. The file system 102 is able to determine the requesting file server protocol based on the path used to access a file system object.

To implement cross-protocol locking, each file system object 110 is associated with multiple per-protocol inodes 120, 122, each one corresponding to a respective file server protocol. For multiple file system objects 110, there are multiple sets of the per-protocol inodes 120, 122.

Note that the per-protocol inodes 120, 122 are virtual inodes that shadow an actual inode of the respective file system object (an inode stores information about a file system object, such as a file, directory, or other object). The inode 120 is associated with a first file server protocol, while the inode 122 is associated with a second file server protocol. The per-protocol inodes 120, 122 are in-memory inodes (which are stored in volatile storage rather than stored in persistent storage).

In accordance with some implementations, each per-protocol inode 120, 122 refers to a data structure 150 that has entries corresponding to respective ones of the different file server protocols (e.g. protocols A and B in FIG. 1A). In some examples, this data structure 150 is referred to as a protocol usage table—in other examples, the data structure can have another format. Each entry of the protocol usage table indicates whether an access is currently being made from a respective file server protocol. In some implementations, each entry of the protocol usage table includes count information to count a number of read accesses from the respective file server protocol, and a number of write accesses from the respective file server protocol. Further details regarding the protocol usage table are provided below in connection with FIG. 4.

The multiple per-protocol inodes 120, 122 associated with a given fife system object refer to the same protocol usage table 150, which as noted above has multiple entries corresponding to the different file server protocols. Another file system object would be associated with its corresponding distinct group of per-protocol inodes 120, 122 and protocol usage table 150.

Using the protocol usage table 150 referred to in the per-protocol inodes 120, 122, the file system 102 is able to allow or deny a request from a file server protocol for access of a file system object.

Figure 1B:
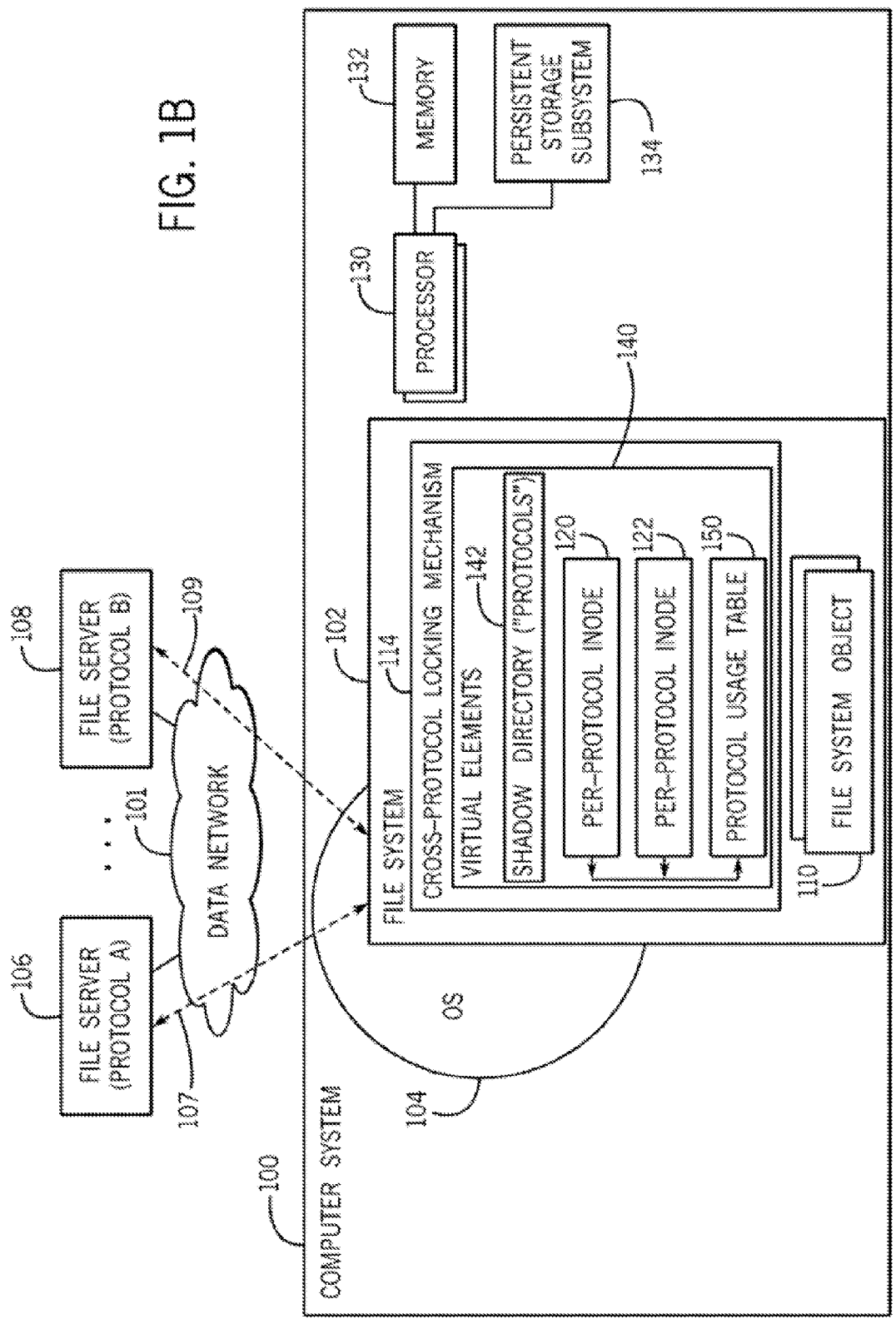

FIG. 1B illustrates another example arrangement that includes various components of FIG. 1A, except further components are also shown. FIG. 1B depicts a computer system 100 that includes an operating system 104 and the file system 102 according to some implementations. Examples of the computer system 100 include a server computer, a user computer (e.g., notebook computer, desktop computer, client computer, tablet computer), a storage system (e.g., a storage server, an archive server, a backup server, etc.), or any other type of electronic device.

The file system 102 can be considered to be part of the operating system 104, or alternatively, the file system 102 can be implemented separately from the operating system 104.

The file servers 106, 108 are able to access the computer system 100 over a data network 101. In different examples, the file servers 106, 108 may be provided in the computer system 100. The computer system 100 can include a single computer node, or a distributed arrangement of multiple computer nodes.

The computer system 100 also includes one or multiple processors 130, a memory 132, and a persistent storage subsystem 134. The memory 132 can be volatile memory, such as a random access memory. The persistent storage subsystem 134 can be implemented with non-volatile storage device(s) such as disk-based storage device(s), integrated circuit storage device(s), and so forth.

The file system objects 110 can be stored in the persistent storage subsystem 112. The persistent storage subsystem 112 can also store persistent inodes (or "on-disk" nodes)—such persistent inodes are distinguished from in-memory inodes. Persistent inodes are not discussed further below.

In-memory inodes (including actual in-memory inodes and virtual inodes) are stored in the memory 132. Also, various virtual elements 140 that are part of the cross-protocol locking mechanism 114 can be stored in the memory 132. Such virtual elements 140 include the virtual inodes 120, 122 and protocol usage table 150 discussed above, as well as a shadow directory 142 (named "Protocols" in some examples). This shadow directory 142 is used to shadow the root directory of a file system hierarchy implemented by the file system 102. The virtual elements 140 can also include additional elements, which are discussed further in connection with FIG. 7 below. Other file system elements can also be stored in the memory 132 (discussed further below).

FIG. 2 illustrates an in-memory inode 200, which can be one of the virtual inodes 120, 122 or an actual inode of a file system object. The inode 200 has various fields, including an inode_number field (which is a number to identify the inode), and an inode_type field, which indicates that the type of the file system object is either a file or a directory. The inode 200 also includes an inode_sub_type field to indicate a particular sub-type of the file system object, which in some implementations can be normal or a protocols_directory. A "normal" file system object refers to a normal file or directory. A file system object according to the protocols_directory sub-type is a shadow directory (which is discussed further below).

The inode 200 also includes a file system ID field, which contains an identifier of the file system. If there are multiple file systems, then each file system is identified by a respective unique file system ID. In addition, the inode 200 includes an inode_protocol_usage field that refers to a protocol usage fable 150 (shown in FIG. 4, discussed further below).

In addition, the inode 200 includes an inode_reference_count field, which counts a number of accesses of a respective file system object from a corresponding file server protocol. The inode_reference_count field is incremented with each access (read or write access) of the respective file system object from the corresponding file server protocol.

The inode 200 also includes an inode_protocol field that can be set to identify various file server protocols, such as CIFS, NFS, etc. Another possible value for the inode_protocol field is the "UNSET" value, which indicates that a file server protocol has not been set for the inode 200.

FIG. 3 illustrates an in-memory inode cache 300 (stored in the memory 122 of FIG. 1B). The in-memory inode cache 300 contains information pertaining to inodes that are currently open (inodes that are associated with file system objects being accessed by respective file servers). In the example of FIG. 3, each entry of the inode cache 300 contains an inode number and the respective in-memory inode. Entry 302 contains inode_number_1, which identifies in-memory inode_1. Entry 304 contains inode_number_2, which identifies in-memory inode_2. An inode number is distinct for each file system object, and is an internal address that is used by the file system. The inode number may be translatable to an address of the persistent storage subsystem 134.

The in-memory inode cache 300 is searched, in response to a request to access the file system object, to determine if any inode corresponding to the given file system object is open. Each matched node can be discriminated by inode_type and/or inode_sub_type and/or file_system_id and/or inode_protocol (fields that are part of the inode 200 shown in FIG. 2).

FIG. 4 illustrates a protocol usage table 150, which has multiple entries 402, 404, one for each file server protocol. There are multiple protocol usage tables 150 associated with multiple respective file system objects. Each protocol usage table is referred to by a group of per-protocol inodes (e.g. 120, 122 in FIG. 1A or 1B). In the example of FIG. 4, two entries 402 and 404 for two respective different file server protocols (protocol_A and protocol_B) are depicted. The entry 402 contains a number of readers (num_A_readers) field and a number of writers (num_A_writers) field corresponding to protocol_A. Entry 404 corresponds to protocol_B, and contains a number of readers (num_B_readers) field and a number of writers (num_B_writers) field.

For each read access of the corresponding file system object from protocol_A, the num_A_readers field is incremented, and for each write access of the corresponding file system object from protocol_A, the num_A_writers field is incremented. Similarly, for each read access of the corresponding file system object from protocol_B, the num_B_readers field is incremented, and for each write access of the corresponding file system object from protocol_B, the num_B_writers field is incremented.

The protocol usage table 150 further includes a protocol_table_reference_count field, which counts a number of virtual inodes (e.g. 120, 122) that refer to the protocol usage table 150.

FIG. 5 depicts an in-memory directory entry 500 that contains information pertaining to a directory (which is a collection of objects, such as files, subdirectories, and other objects, such as sockets). A directory is logically a collection of directory entries. Each directory entry 500 has the following two fields: link_name and inode_number.

FIG. 6 illustrates an in-memory file handle 600 that refers to an in-memory file object. The file handle 800 is created in response to a request to open a file object. The file handle 600 includes a file_inode field that refers to an in-memory inode (200 in FIG. 2). The file handle 600 also includes a file_access field, which indicates whether the access of the in-memory inode is a read access or a write access (or both read and write access).

Figure 7:
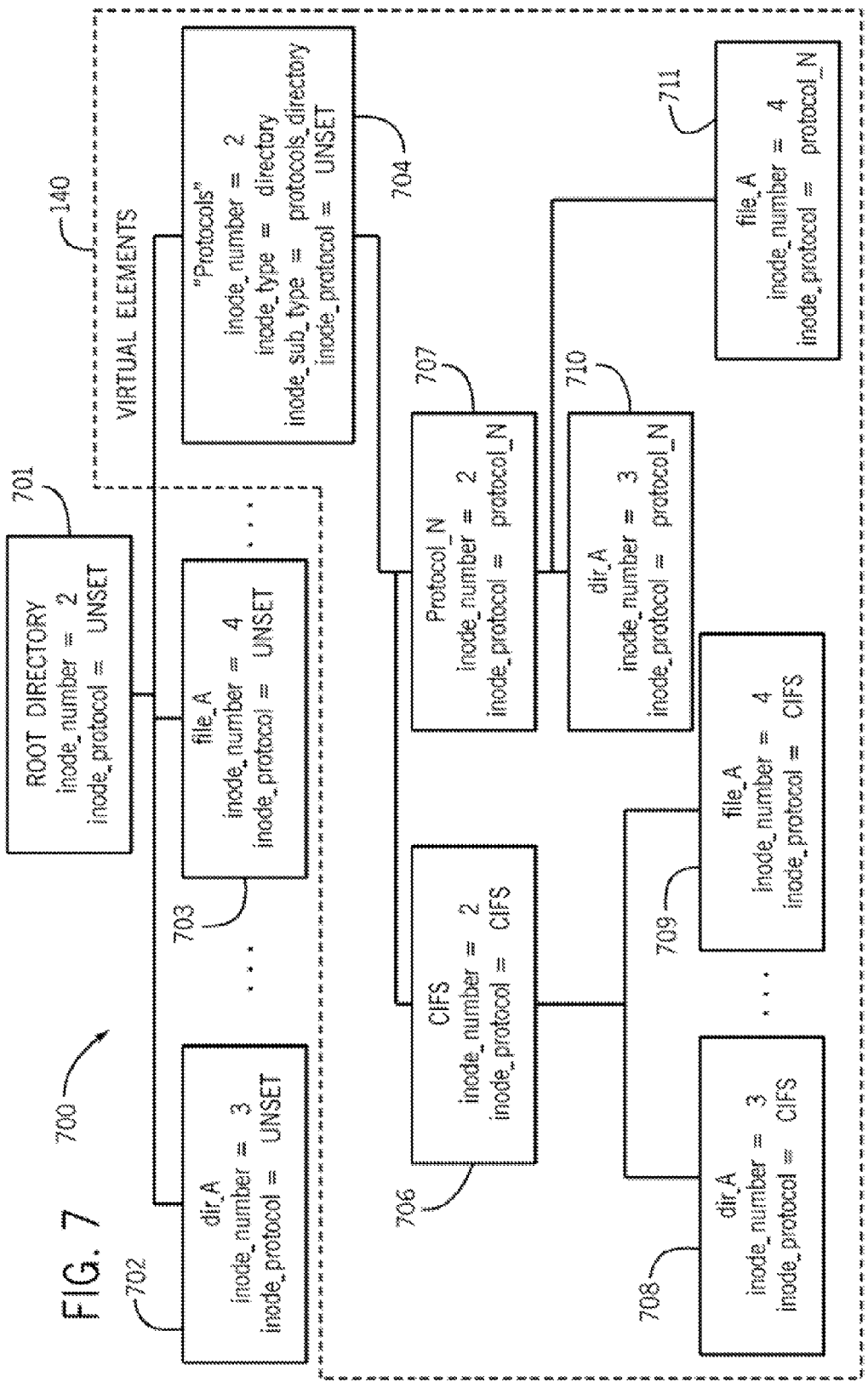
FIG. 7 illustrates a file system; hierarchy according to some implementations.

An example file system hierarchy 700 according to some implementations is shown in FIG. 7. The file system hierarchy includes a root directory 701, which is the top directory. The root directory 701 is itself stored as an inode (which in the example of FIG. 7 is identified by inode_number 2). Under the root directory 701 are other file system objects, which in the example of FIG. 7 includes a directory inode 702 (for directory dir_A) and a file inode 703 (for file file_A). The directory inode 702 is identified by inode_number 3, while the file inode 703 is identified by inode_number 4. Each of the inodes 702 and 703 have their respective inode_protocol fields set to the "UNSET" value. Note that the inodes 702 and 703 are actual inodes for respective file system objects (dir_A and file_A, respectively), and thus the concept of file server protocol does not apply to these inodes. Rather, the inode_protocol fields for virtual inodes (such as per-protocol inodes 120, 122 in FIG. 1A or 1B) are set to identify respective file server protocols. Although just one directory and one file is shown in the file system hierarchy 700, it is noted that a typical file system hierarchy can have a relatively large number of directories and files. Moreover, a directory can have multiple levels of sub-file system objects (subdirectories and files) under the directory.

In accordance with some implementations, virtual elements (represented generally as 140) are part of the file system hierarchy 700. The virtual elements 140 include a shadow directory inode 704, which is assigned the special "Protocols" name. Note that the virtual directory inode 704 is also identified by inode_number 2, since it shadows the root directory 701. The inode_type of the shadow directory inode 704 is "directory," while the inode_sub_type of the virtual directory inode 704 is "protocols_directory." The inode_protocol field of the shadow directory inode 704 is set to the "UNSET" value.

Under the shadow directory inode 704 are additional virtual inodes 706 and 707 for shadowing the root directory 701 for corresponding different file server protocols (e.g. CIFS, protocol_N). Each virtual root directory inode 706, 707 is also identified by inode_number 2 (the inode number of the root directory 701). In addition, the inode_protocol fields of the virtual root directory inodes 706, 707 are set to respective "CIFS" and "protocol_N" values to identify the respective different file server protocols.

Each virtual root directory inode 706, 707 points to further virtual inodes that shadow the actual inodes 702, 703. For example, the CIFS virtual root directory inode 708 points to a virtual inode 708 (having inode_number 3 and inode_protocol field set to "CIFS") that shadows the directory inode 702, and to a virtual inode 709 (having inode_number 4 and inode_protocol field set to "CIFS") that shadows the file inode 703. Similarly, the "protocol_N" virtual root directory inode 707 points to respective a virtual inode 710 (having inode_number 3 and inode_protocol field set to "protocol_N") that shadows the directory inode 702, and a virtual inode 711 (having inode_number 4 and inode_protocol field set to "CIFS") that shadows file inode 703.

Figure 8:
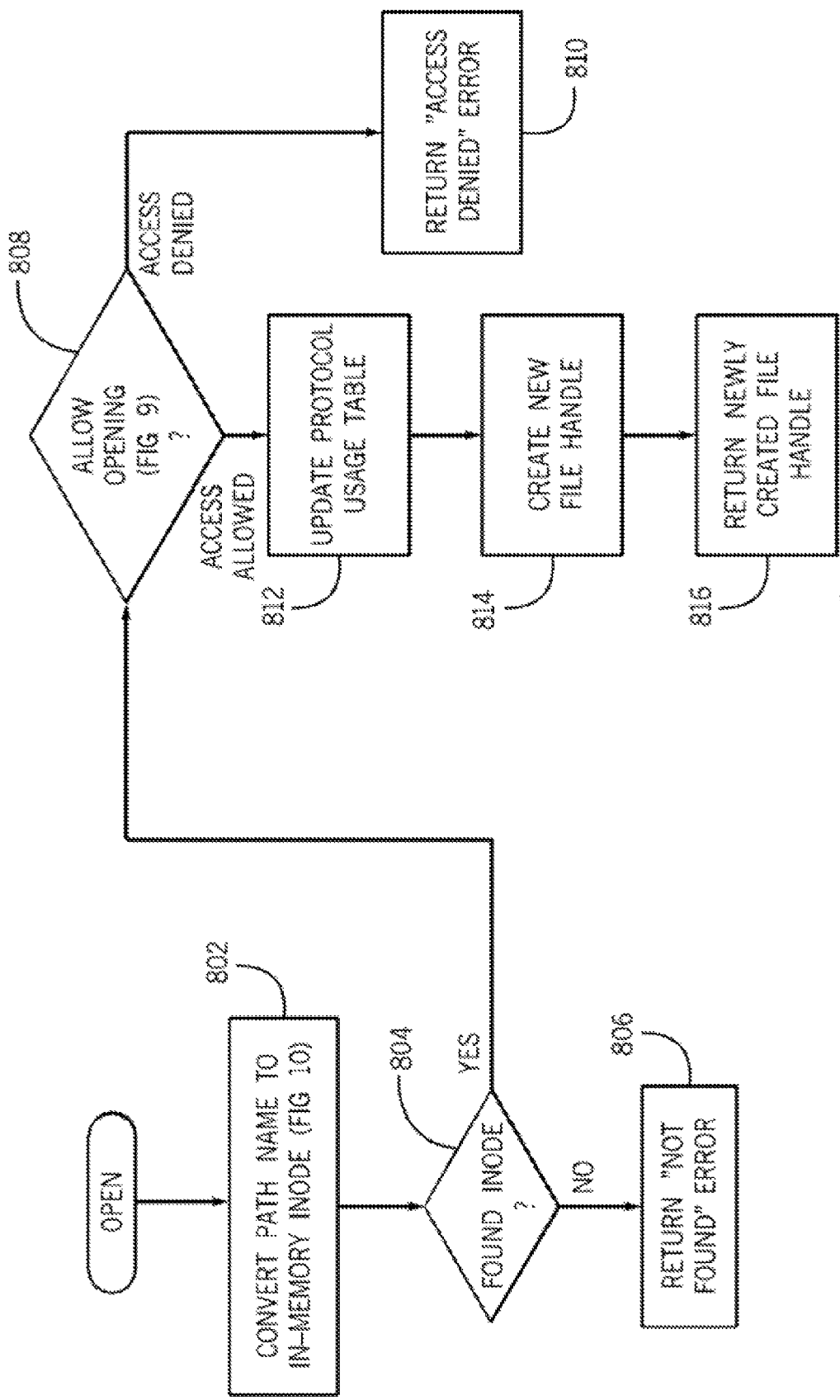
FIGS. 8-15 are flow diagrams of various procedures of a file system, according to various implementations.

FIG. 8 is a flow diagram of a process, performed by the file system 102, of opening an inode along a particular path (one of paths 107, 109 depicted in FIG. 1A or 1B, for example), for a given access (read and/or write access). A path name in the access request is converted (at 802) to an in-memory inode (using a procedure according to FIG. 10, discussed further below). The file system 102 then searches (at 804) the in-memory cache 300 as well as data structures in the persistent storage subsystem 134 to determine whether the corresponding inode is present in the file system 102. If not, a "not found" error is returned (at 806).

However, if the inode is found, then the file system 102 determines (at 808) if the in-memory inode_protocol field of the corresponding inode allows for opening using the desired access (read and/or write). This determination is based on a procedure according to FIG. 9, discussed further below. If the determination at 808 indicates that access is to be denied (such as when a write access is attempted on an inode that is already open for another access, either read or write), then the file system returns (at 810) an "access denied" error.

On the other hand, if the determination at 808 indicates that access is allowed, then the appropriate entry of the protocol usage table 150 (FIG. 4) is updated (at 812). The appropriate entry of the protocol usage table 150 is identified (where the identified entry corresponds to the protocol of the current read and/or write access), and the respective number of readers or number of writers field is incremented based on the requested access. In other words, if the present access is a read access, then the number of readers field is incremented, whereas if the present access is a write access, then the number of writers field is incremented.

Next, the file system creates (at 814) a new file handle (e.g. file handle 600 shown in FIG. 6) that references the discovered inode. The file_access entry of the file handle 600 is set to the requested access (read access or write access or both). The newly created file handle is returned (at 816), where the newly created file handle is stored in some data structure (such as an index table) to allow for later access.

Figure 9:
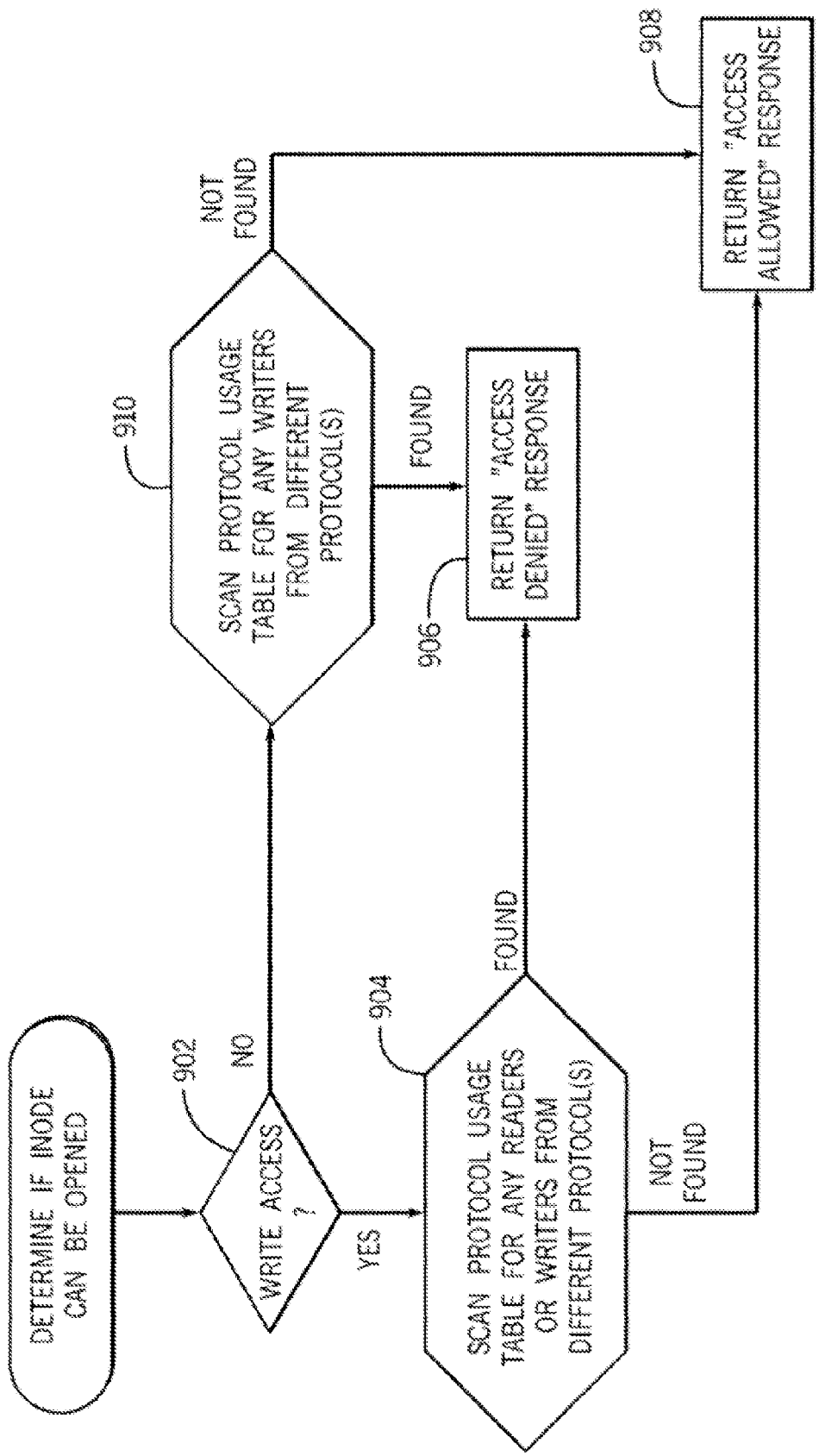

FIG. 9 illustrates a procedure of the file system 102 to determine if a given inode can be opened. The procedure of FIG. 9 is invoked from task 808 in FIG. 8, discussed above.

Given the in-memory inode and the desired access (read and/or write), the procedure of FIG. 9 determines (at 902) if the requested access is a write access. If so, then the procedure scans (at 904) the protocol usage table 150 (identified by the inode's inodes_protocol_usage field of the inode) for any reader or writer for a protocol that is different than the inode_protocol of the given inode (that is to be opened). For example, if a current access request is from file server protocol_A, then the file system checks the entry (or entries) for other protocols (e.g. entry 404 in table 160 shown in FIG. 4) to determine if there is any read or write access from file server protocol protocol_B (either num_B_readers is non-zero or num_B writers is non-zero).

If any read or write accesses from a different protocol (different from the protocol of the present access request), then the procedure returns (at 908) an "access denied" response. On the other hand, if the associated protocol usage table indicates that no read or write access from a different protocol is currently active, than the procedure returns (at 908) an "access allowed" response.

If the procedure of FIG. 9 determines (at 902) that the requested access is not a write access (it is a read access), then the procedure scans (at 910) the protocol usage table 150 for any write access from a different file server protocol (different from the file server protocol of the requested access). If a write access from a different file server protocol is found (i.e. the number of writers field of the entry of the protocol usage table 150 corresponding to the different file server protocol is non-zero), then the procedure returns (at 906) an "access denied" response. On the other hand, if a write access from a different file server protocol is not found, then the procedure returns (at 908) an "access allowed" response.

Figure 10:
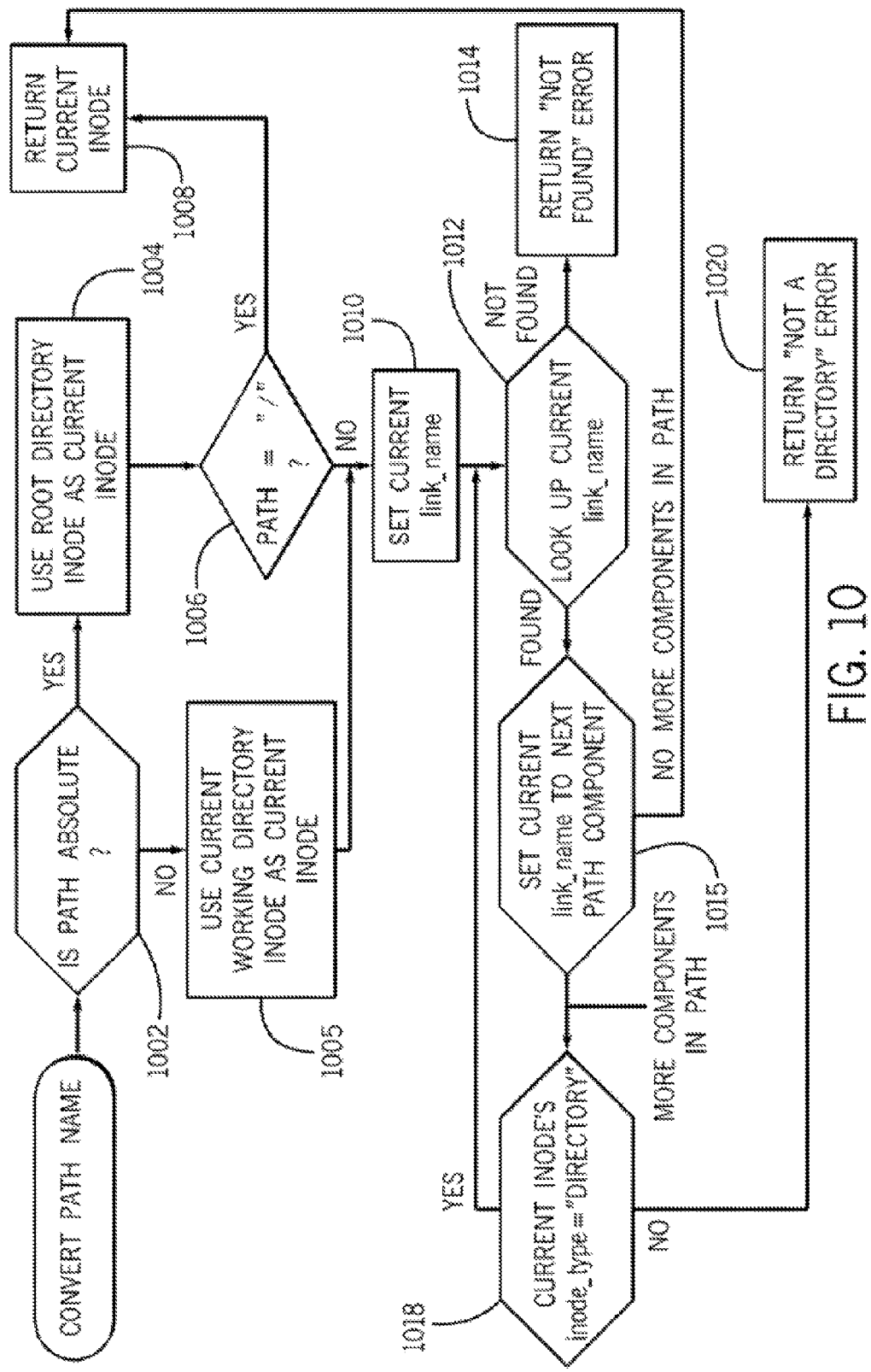

FIG. 10 is a procedure of the file system 102 to convert a path name (e.g. /home/bob/project.txt) to an inode (invoked at 802 in FIG. 8). First, the procedure determines (at 1002) if the path name is absolute (in other words, if the path name begins with "/". If so, then the root directory inode is used as the current inode (at 1004). The procedure determines, (at 1006) if the path name is equal "/". If so, then the current inode is returned (at 1008). On the other hand, if the path name is not equal "/", then the procedure sets (at 1010) the current link_name from the first path component found in the path.

If the determination at 1002 indicates that the path is not absolute, then the current working directory inode is used (at 1006) as the current inode.

The procedure then recursively performs tasks 1012, 1015, and 1018 to go through the different components of the path to find respective inodes, until the end of the path is reached and the in-memory inode corresponding to the last component of the path is found (in the example path name/home/bob/project.txt given above, the in-memory inode for the file "project.txt" is returned).

Figure 11:
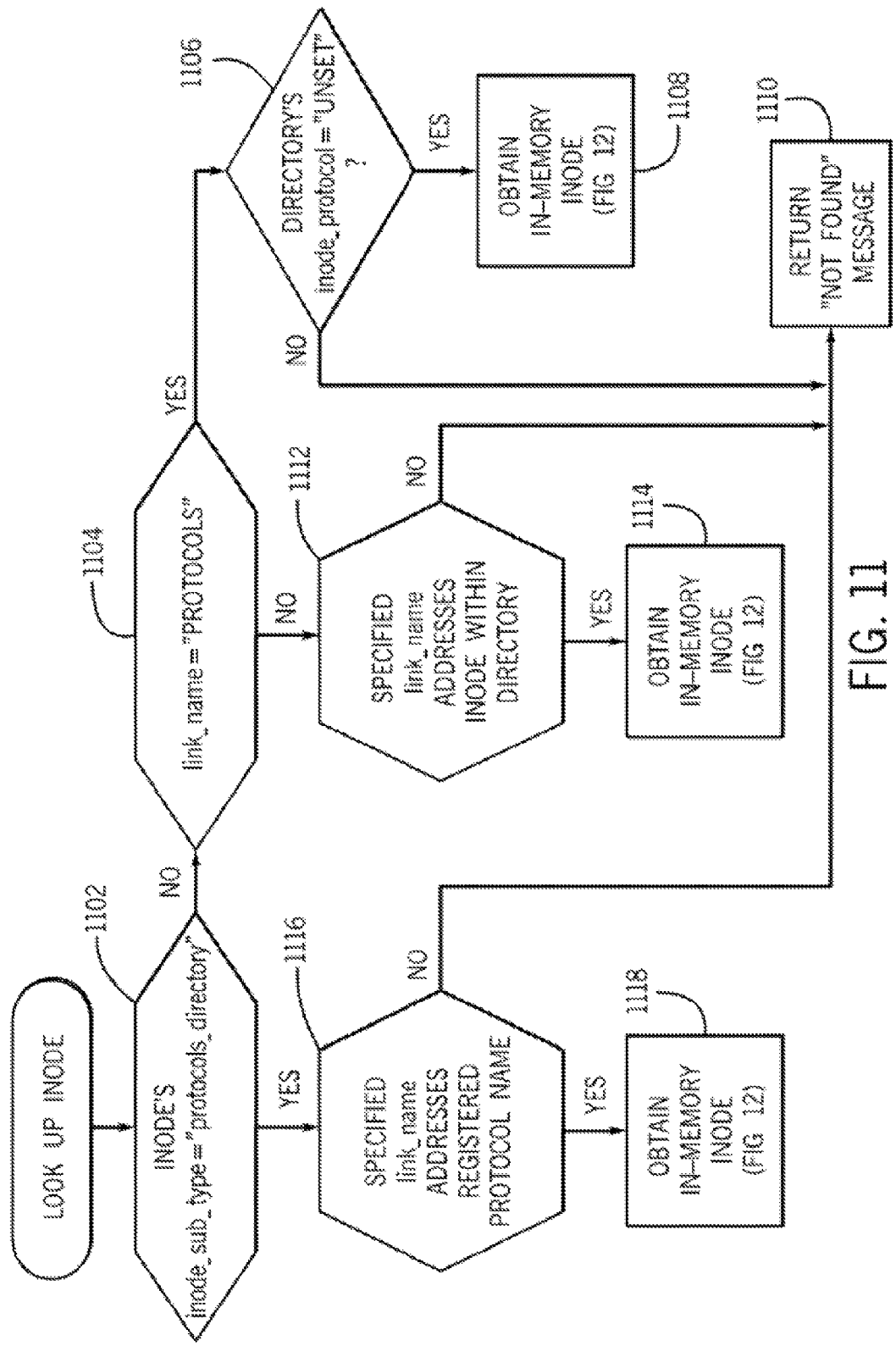

An in-memory inode corresponding to the current link_name is looked up (at 1012), using a procedure according to FIG. 11. The current inode found by the procedure of FIG. 11 is used as the current inode. If no inode is found at 1012, then a "not-found" error is returned (at 1014).

On the other hand, if an inode is found by the procedure of FIG. 11, the current link_name is then set (at 1015) to the next path component. If there are no more path components, then the current inode is returned (at 1008). On the other hand, if there is a next path component, it is determined (at 1018) whether the current inode has an inode_type field that is equal to "directory." If not, then a "not-a-directory" error is returned (at 1020). However, if the inode_type field of the current inode is equal "directory" then the procedure returns to task 1012, where the process repeats.

Figure 12:
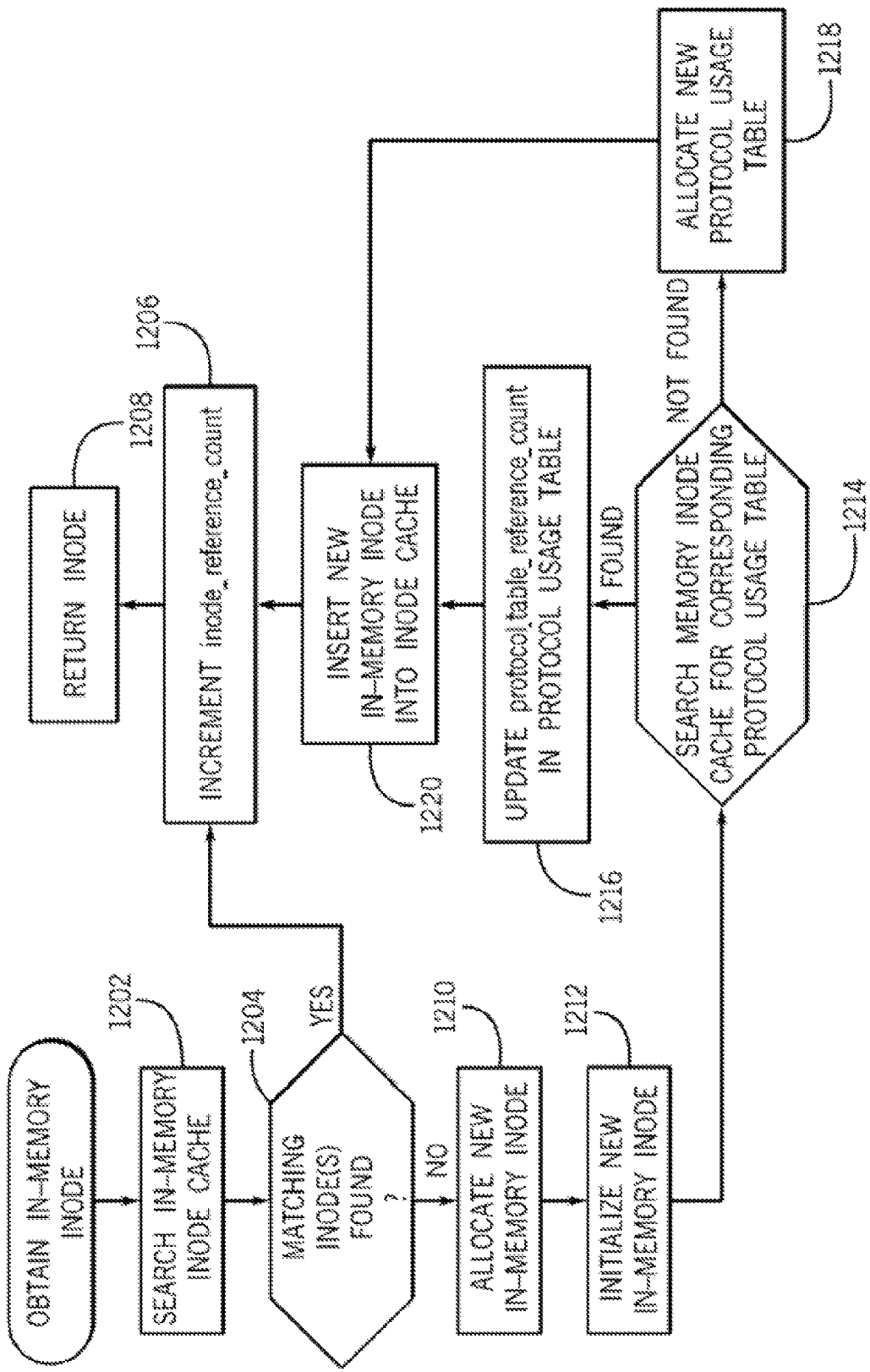

The procedure of FIG. 11 determines (at 1102) whether the inode's inode_sub_type field indicates "protocols_directory." If not, the procedure next determines (at 1104) whether the link_name is equal to the special "Protocols" name (for the shadow directory inode 704 in FIG. 7). If so, the procedure determines (at 1106) whether the directory's inode_protocol field has an "UNSET" value. If so, then a procedure of FIG. 12 is used (at 1108) to obtain the in-memory inode from the inode cache 300 (FIG. 3) using the following information: file system ID, inode_number, inode_type="directory" inode_sub_type=protocols_directory and inode_protocol="UNSET."

If the procedure determines (at 1106) that the directory's inode_protocol field is not "UNSET," then a "not-found" message is returned (at 1110).

If the determination at 1104 indicates that the link_name is not equal to the special "Protocols" name, which indicates that the directory is a normal directory, then it is determined (at 1112) whether the specified link_name addresses an inode within the directory. If not, then a "not-found" message is returned (at 1110). However, if the specified link_name addresses an inode within the directory, the procedure uses (at 1114) the procedure of FIG. 12 to obtain the in-memory inode from the inode cache 300 using the inode_number from the corresponding directory entry. Additionally, the procedure sets the inode_type field from the corresponding inode, and sets the inode_sub_type to "normal."

If the determination at 1102 indicates that the directory's inode_sub_type field contains "protocols_directory," then the procedure of FIG. 11 determines (at 1116) if the specified link_name addresses a registered protocol name. If not, then a "not-found" message is returned (at 1110).

However, if the specified link_name addresses a registered protocol name, then the procedure of FIG. 12 is used (at 1118) to obtain the in-memory inode from the inode cache 300 using the following information: file system ID and inode_number. Also, from the corresponding directory inode, the following fields are set as follows: inode_type="directory"; inode_sub_type=normal; and inode_protocol=link_name.

The procedure of FIG. 12 obtains an in-memory inode from the inode cache 300, based on the following input information: file system ID, inode_number, inode_type, inode_sub_type, inode_protocol. Such information is used (at 1202) to search the in-memory inode cache 300. If matching inode(s) is (are) found (as determined at 1204), then the inode_reference_count field in the respective in-memory inode is incremented (at 1206). The inode is then returned (at 1208).

However, if no matching inode is found in the inode cache 300, a new in-memory inode is allocated (at 1210). The new in-memory inode is initialized (at 1212) with the input input_number, inode_type, inode_sub_type, and inode_protocol. The file system ID and inode_number are used to search (at 1214) the in-memory inode cache 300 for any inode referring to a corresponding protocol usage table 150. Note that multiple per-protocol inodes for a given file system object refer to a common protocol usage table 150.

If such protocol usage table 150 is found (as determined at 1214), then the protocol_table_reference_count in the protocol usage table 150 is incremented (at 1216). The newly allocated inode's inode_protocol_usage field is set to reference the identified inode protocol usage table 150.

If the specified protocol usage table is not found (as determined at 1214), then a new, empty protocol usage table 150 is allocated (at 1218), with the protocol_table_reference_count in the new protocol usage table 150 set to 1. The inode_protocol_usage field of the newly allocated inode is set to refer to the newly allocated protocol usage table 150.

The newly allocated inode is then Inserted (at 1220) into the inode cache 300.

Figure 13:
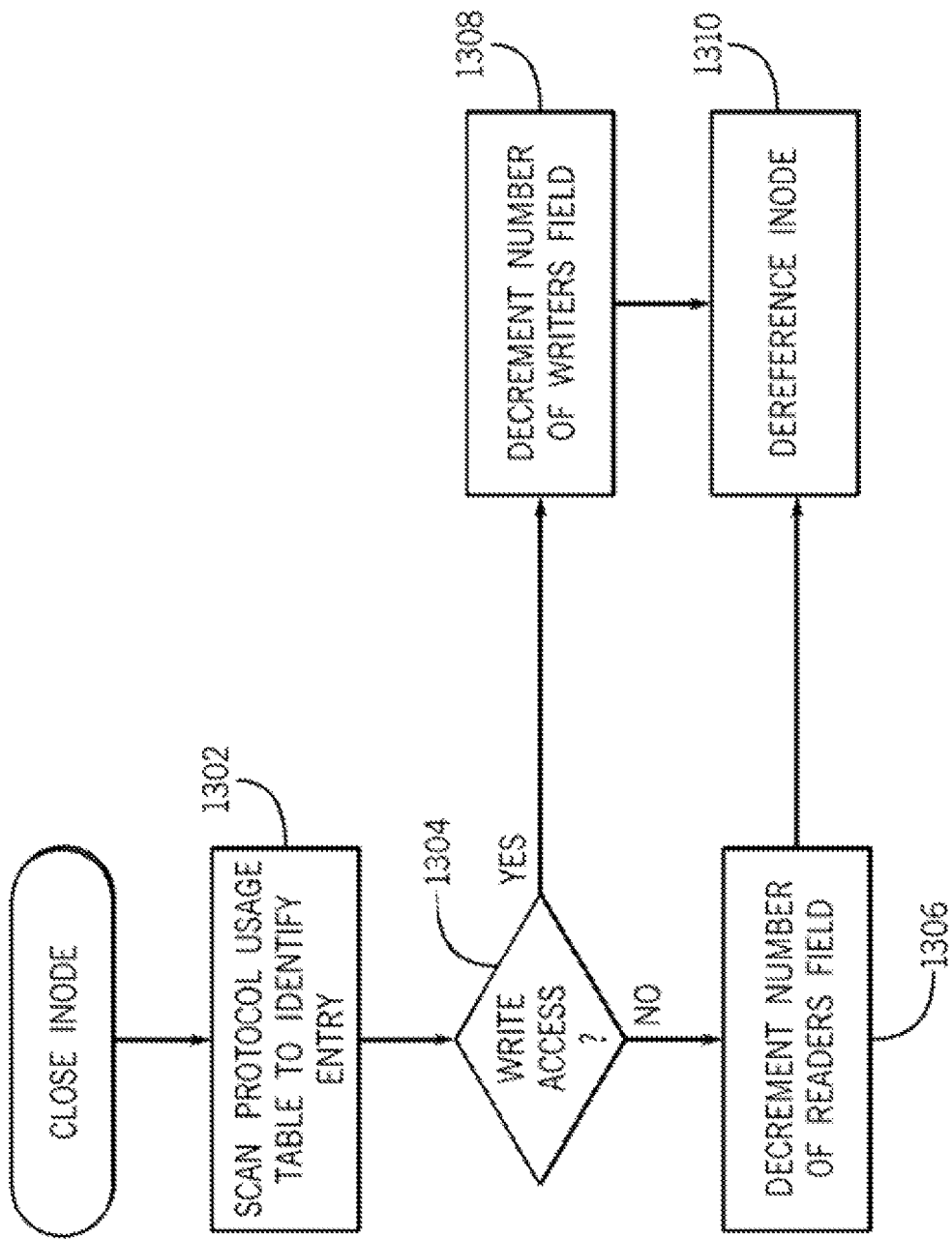

FIG. 13 illustrates a procedure of the file system 102 to close an inode that was previously opened, such as opened using the procedure of FIG. 8. Given an in-memory file object (which is a wrapper around a respective inode), the protocol usage table 150 is scanned (at 1302) for an entry identified by the inode_protocol field of the inode. This identified entry is recorded. Next, the procedure determines (at 1304) whether the file access associated with opening the inode is a write access. If not, then the number of readers field in the identified row of the inode protocol usage table 150 is decremented (at 1306). However, if the file access was a write, then the number of writers field in the identified entry of the protocol usage table 150 is decremented (at 1308). The procedure of FIG. 14 is then invoked (at 1310) to dereference an inode.

Effectively, according to the procedure of FIG. 13, when an inode corresponding to a particular file server protocol is closed, the corresponding number of readers or number of writers field in the protocol usage table 150 is decremented.

Figure 14:
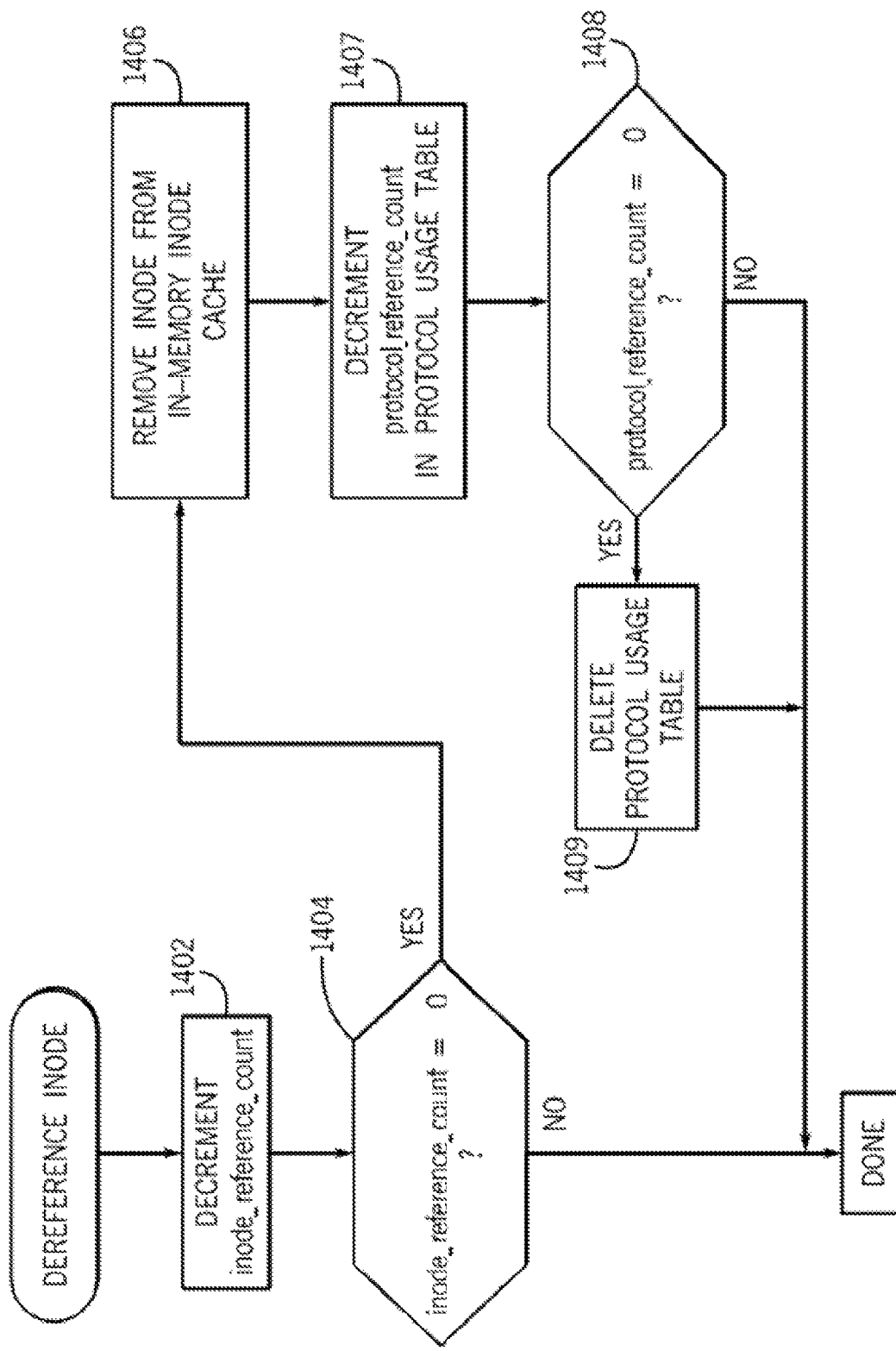

FIG. 14 shows a procedure of the file system 102 to dereference an inode (as invoked at task 1310 in FIG. 13). The inode_reference_count of the inode to be dereferenced is decremented (at 1402). If the inode_reference_count is zero (as determined at 1404), then the procedure of FIG. 14 removes (at 1408) the inode from the in-memory inode cache 300. On the other hand, if the inode inode_reference_count is not zero, then the procedure completes. The inode_reference_count being equal to zero means that there are no further pending accesses of the respective inode, such that the inode can be removed from the inode cache 300.

After task 1406, the procedure decrements (at 1407) protocol_reference_count in the protocol usage table 400 (FIG. 4). Next, the procedure determines (at 1408) whether protocol_reference_count is zero; if so, the protocol usage table 400 is deleted (at 1409).

Figure 15:
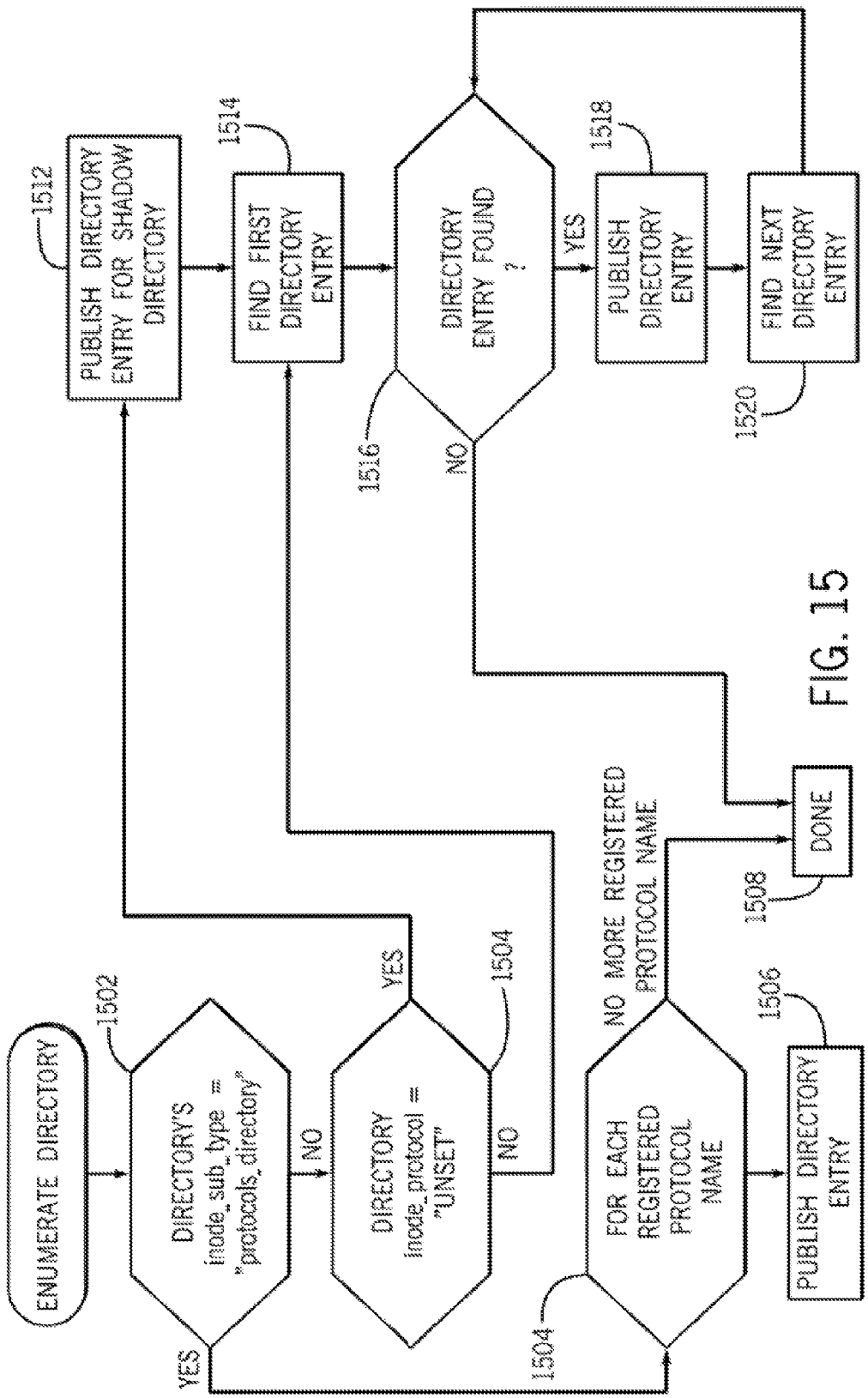

FIG. 15 is a flow diagram of a procedure of the file system 102 of enumerating a directory, such as the root directory of the file system hierarchy 700 shown in FIG. 7. Given an open file handle to a directory inode (the inode corresponding to the root directory, for example), the procedure of FIG. 15 determines (at 1502) whether the directory inode's inode_sub_type field is equal to "protocols_directory." If so, then for each registered protocol name (e.g. protocol_A, protocol_B, etc) determined at 1504, the directory entry is published (at 1508) with the link_name set to current protocol name and inode_number is set to the starting_directory_inode_number. Basically, at 1506, elements 706 end 707 in the example hierarchy 700 of FIG. 7 are published.

Once there are no more registered protocol names (as determined at 1504), then the procedure of FIG. 15 completes (at 1508), since there are no more directory entries to publish.

If the determination (at 1502) indicates that the directory inode's inode_sub_type is not equal to "protocols_directory" then the procedure determines (at 1510) if the directory inode's inode_protocol has value "UNSET". If so, then the procedure proceeds to task 1512, where the directory entry for the shadow directory is published using the special link_name ("Protocols"), and the inode_number is set equal to a starting_directory_inode number. The procedure then proceeds to task 1514.

If, on the other hand, the directory inode's inode_protocol field is not set to "UNSET," then the procedure proceeds to task 1514, where the first directory entry is identified within the given directory inode. This allows a real file system object to be published.

The procedure next determines (at 1516) whether the directory entry was found. If not, then the procedure ends (1508). However, if the directory entry was found, then the directory entry is published (at 1518) using the link_name and inode_number from the identified directory entry. The procedure next finds (at 1520) the next directory entry within the given directory inode. The process of 1516, 1518, and 1520 are iteratively performed to publish 702, 703, 708, 709, 710, and 711 in the example hierarchy of FIG. 7.

Using techniques or mechanisms according to some implementations, cross-protocol locking can be implemented relatively efficiently.

Machine-readable instructions of modules described above (including the file system 102 of FIG. 1A or 1B) are executed on a processor or multiple processors (such as 130 in FIG. 1B). A processor can include a microprocessor, microcontroller, processor module or subsystem, programmable integrated circuit, programmable gate array, or another control or computing device.

Data and instructions are stored in respective storage devices, which are implemented as one or more computer-readable or machine-readable storage media. The storage media include different forms of memory including semiconductor memory devices such as dynamic or static random access memories (DRAMS or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A computer system comprising:
a machine-readable storage medium to store file system objects;
a memory to store an actual inode for a particular one of the file system objects, and a virtual inode for the particular one of the file system objects, where the virtual inode refers to a data structure containing information indicating that an access of the particular file system object has been made from a first file server operating according to a first file server protocol, the virtual inode includes a protocol field identifying the first file server protocol, and the virtual inode shadows the actual inode; and a processor to execute instructions to implement a file system to be shared by a plurality of file servers operating according to respective different file server protocols, the plurality of file servers including the first file server, wherein the file system is to:

provide the plurality of file servers separate paths to file system objects of the file system, the file system to implement cross-protocol locking in access of the file system objects, and deny access of the particular file system object by a second file server operating according to a second file server protocol of the different file server protocols, in response to the data structure indicating that an access of the particular file system object is present from the first file server protocol.

2. The computer system of claim 1, wherein the data structure includes a counter indicating a number of accesses of the particular file system object from the first file server protocol, the file system to increment the counter in response to receiving an access of the particular file system object from the file server that operates according to the first file server protocol.

3. The computer system of claim 1, wherein the data structure includes first information indicating a number of read accesses of the particular file system object from the first file server protocol, and second information indicating a number of write accesses of the particular file system object from the first file server protocol, the file system to increment a first field in the first information in response to receiving a read access of the particular file system object from the file server that operates according to the first file server protocol, and the file system to increment a second field in the second information in response to receiving a write access of the particular file system object from the file server that operates according to the first file server protocol, the first field indicating the number of read accesses of the particular file system object, and the second field indicating the number of write accesses of the particular file system object.

4. The computer system of claim 3, wherein the data structure includes a first entry containing the first information and the second information, and wherein the data structure further includes a second entry containing third information indicating a number of read accesses of the particular file system object from the second file server protocol, and fourth information indicating a number of write accesses of the particular file system object from the second file server protocol.

5. The computer system of claim 4, wherein the file system is to allow access of the particular file system object by the second file server in response to the data structure indicating that no access of the particular file system object is present from the first file server protocol.

6. The computer system of claim 5, wherein upon allowing access of the particular file system object by the second file server, the file system is to update one of the third information and fourth information in the data structure.

7. The computer system of claim 4, wherein the file system is to allow write access of the particular file system object by the second file server in response to the data structure indicating that no read or write access of the particular file system object is present from the first file server protocol.

8. The computer system of claim 4, wherein the file system is to allow read access of the particular file system object by the second file server in response to the data structure indicating that no write access of the particular file system object is present from the first file server protocol.

9. The computer system of claim 1, wherein the virtual inode is a first virtual inode, and the memory is to store a second virtual inode for the particular file system object, where the second virtual inode also refers to the data structure, the second virtual inode shadows the actual inode, and the second virtual inode has a protocol field identifying the second file server protocol.

10. The computer system of claim 1, further comprising virtual elements that are part of a file system hierarchy, wherein the virtual elements include the first and second virtual inodes, and shadow directory inodes to shadow a root directory of the file system hierarchy.

11. The computer system of claim 1, wherein the access of the particular file system object from the first file server protocol comprises an access received by the file system from a first file server that operates according to the first file server protocol in response to the first file server receiving an access request for the particular file system object from a client, and wherein the access of the particular file system object by the second file server is received by the file system from the second file server in response to the second file server receiving an access request for the particular file system object from the client or another client.

12. The computer system of claim 1, wherein the memory stores, for the particular one of the file system objects, a plurality of virtual inodes, each virtual inode of the plurality of virtual inodes corresponds to a respective file server protocol of the different file server protocols, each virtual inode shadows a same the actual inode for the particular file system object, each virtual inode of the plurality of virtual inodes refers to the data structure, and the data structure indicates a number of present read access and a number of present write accesses of the particular file system object by each virtual inode.

13. A method comprising:

providing, by a processor executing instructions to implement a file system with cross-protocol locking, separate paths for respective file servers to access file system objects of the file system, the file servers operating according to respective different file server protocols;

receiving, by the processor, a request from a first file server of the file servers that operates according to a first file server protocol to access a particular file system object of the file system;

determining, by the processor, whether the request is to be denied, wherein the determining comprises:

accessing a virtual inode corresponding to the particular file system object, the virtual inode having a protocol field identifying the first file server protocol and the virtual inode shadowing an the actual inode for the particular file system object, and checking a data structure referred to by the virtual inode to determine whether an access of the particular file system object is currently active from a second file server of the file servers that operates according to a second file server protocol that is different from the first file server protocol; and denying, by the processor, the request in response to the data structure indicating an access of the particular file system object is currently active from the second file server.

14. The method of claim 13, wherein checking the data structure comprises checking a protocol usage table having plural entries corresponding to different file server protocols including the first and second file server protocols, wherein each of the entries contains a first field identifying a number of read accesses from the respective server protocol, and a second field identifying a number of write accesses from the respective file server protocol, the method further comprising:

incrementing, by the file system, the first field in response to receiving a read access of the particular file system object from the file server that operates according to the respective file server protocol;

incrementing, by the file system, the second field in response to receiving a write access of the particular file system object from the file server that operates according to the respective file server protocol.

15. The method of claim 14, further comprising:

updating corresponding information in one of the entries of the protocol usage table in response to closing an inode corresponding to the particular file system object, wherein the updating includes decrementing the first field identifying the number of read accesses or the second field identifying the number of write accesses from a given one of the file server protocols.

16. The method of claim 13, wherein the request from the first file server is sent by the first file server to the file system in response to the first file server receiving an access request for the particular file system object from a client, and wherein the access of the particular file system object from the second file server is received by the file system from the second file server in response to the second file server receiving an access request for the particular file system object from the client or another client.

17. An article comprising at least one non-transitory machine-readable storage medium storing instructions that upon execution by a processor cause a file system to:

provide, by the file system, separate paths for respective file servers to access file system objects of the file system, the file servers operating according to respective different file server protocols;

receive, by the file system, a request from a first file server of the file servers that operates according to a first file server protocol, where the request is to access a particular file system object of the file system;

determine, by the file system as part of cross-protocol locking, whether the request is to be denied, wherein the determining comprises:

accessing a virtual inode corresponding to the particular file system object, the virtual inode having a protocol field identifying the first file server protocol and the virtual inode shadowing an the actual inode maintained by the file system for the particular file system object, and checking a data structure referred to by the virtual inode to determine whether an access of the particular file system object is currently active from a second file server of the file servers that operates according to a second file server protocol that is different from the first file server protocol; and deny, by the file system, the request in response to the data structure indicating an access of the particular file system object is currently active from the second file server.

18. The article of claim 17, wherein the request from the first file server is sent by the first file server to the file system in response to the first file server receiving an access request for the particular file system object from a client, and wherein the access of the particular file system object from the second file server is received by the file system from the second file server in response to the second file server receiving an access request for the particular file system object from the client or another client.

\* \* \* \* \*